May 24, 1960     C. D. HILLMAN     2,937,570
TELESCOPE
Filed Aug. 29, 1957
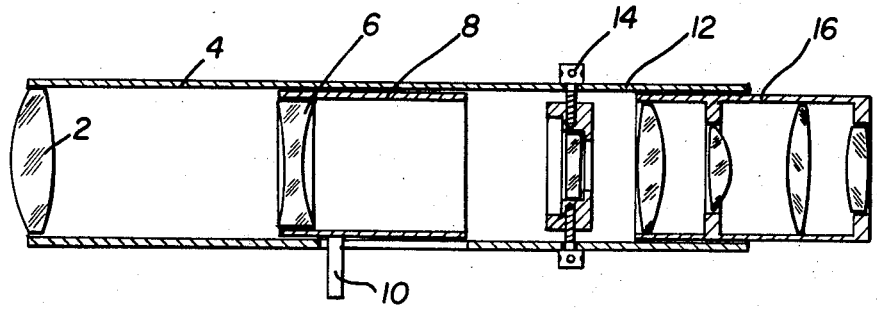
PRIOR ART     FIG. I
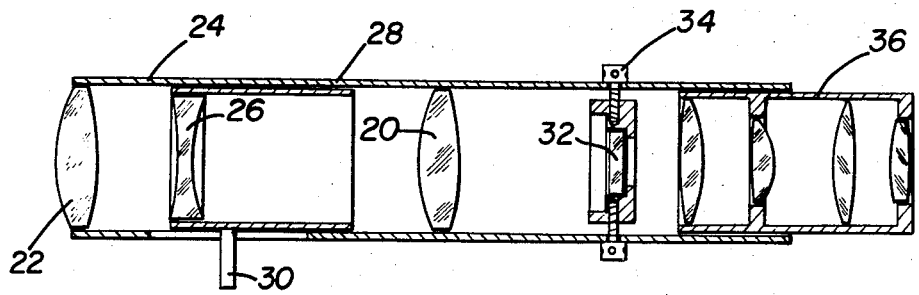
FIG. II
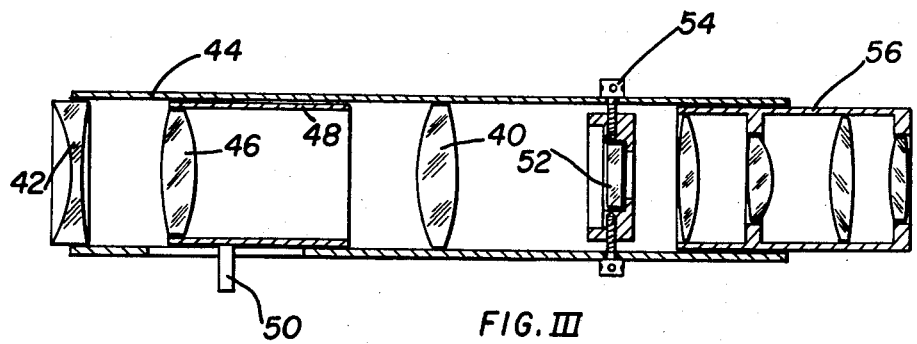
FIG. III
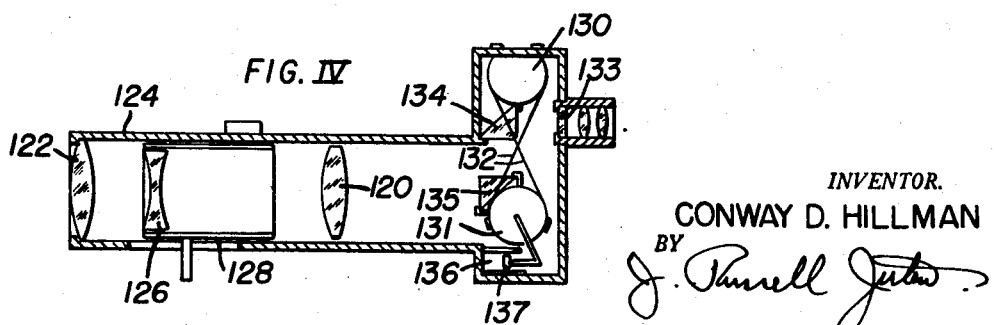
FIG. IV
INVENTOR.
CONWAY D. HILLMAN
BY
ATTORNEY

United States Patent Office 2,937,570
Patented May 24, 1960

2,937,570
TELESCOPE

Conway D. Hillman, Millburn, N.J., assignor to Keuffel & Esser Company, Hoboken, N.J., a corporation of New Jersey Filed Aug. 29, 1957, Ser. No. 681,023

8 Claims. (Cl. 88—32)

This invention relates to a focusable constant magnification telescope which is particularly useful in surveying an optical tooling.

One branch of surveying in which the new telescope is particularly useful is the branch known as stadia measurements. In making stadia measurements a telescope having stadia cross wires on the reticle is used. The instrument is sighted at a stadia rod which is held vertically and is usually graduated in 100ths of a foot. The stadia cross wires at the reticle of the telescope which are separated by an amount called the stadia interval subtend a portion of the stadia rod which depends upon the distance of the stadia rod from the telescope. The ratio of the distance from the stadia rod to the telescope over the distance subtended on the stadia rod by the stadia cross wires is called the stadia ratio which is made equal to some convenient ratio, often 100 to 1. Obviously, it is necessary to focus the telescope on the stadia rod for each stadia measurement which is made. If the magnification of the telescope changes as it is focused, this introduces an error in the stadia measurements.

Many years ago the standard type of surveying instrument telescope was a type known as an external focusing telescope. This telescope focused by merely moving the objective lens in and out. When using this type of instrument stadia measurements were made from a point in front of the objective to the stadia rod and it was necessary to correct the stadia measurements to obtain the distance to the center of the instrument by adding a figure called the stadia constant which was equal to the distance from the point in front of the objective to the center of the instrument. As the instrument was focused the value of the stadia constant changed by an amount equal to the amount of movement of the objective.

About fifty years ago, the internal focusing telescope was introduced into the art of surveying. This is now considered the standard surveying instrument telescope. In this type of telescope, the objective lens is fixed and focusing is achieved by means of a negative lens which is moved between the objective and the reticle. When this type of telescope is used, the point from which the stadia measurements are made is usually within the telescope and by proper design of the telescope can be made to coincide very closely with the center of the telescope or with the vertical axis of the surveying instrument on which the telescope is mounted. This point from which the stadia measurements are made is called the anallatic point of the telescope. Due to the movement of the focusing lens, the position of the anallatic point changes as the telescope is focused. Thus the magnification changes at least slightly when an internal focusing telescope is focused and may introduce slight errors in the stadia readings. However, in a properly designed internal focusing telescope, the movement of the anallatic point is very small and for many ordinary stadia measurements, it may be considered negligible. A complete mathematical analysis of this subject is given in an article entitled "Stadia Characteristics of the Internal Focusing Telescope" by William Musetter which appears in "Surveying and Mapping" for January to March 1953. "Surveying and Mapping" is the quarterly journal of the American Congress on Surveying and Mapping.

In making stadia measurements of the highest accuracy, in which subtense bars may be used instead of stadia rods and also other special tachymetric devices and attachments may be employed, the errors introduced by the change in magnification of the telescope and the movement of the anallatic point as the telescope is focused can introduce errors which have to be taken into account. These errors become much more pronounced if the telescope is designed to focus on extremely near objects. An ordinary transit telescope for example will focus from 6 feet to infinity. However, recently more and more interest is being shown in telescopes which focus to closer distances, say from a few inches to infinity. Such telescopes are used extensively in optical tooling work as distinguished from surveying. The movement of the anallatic point would have to be considered in making accurate stadia measurements with a telescope which focuses down to these near distances.

In recent years, levels are being used in the surveying instrument art which depend upon the action of gravity on a pendulum to automatically compensate for inaccuracies in the leveling of the instrument. In such instruments, the anallatic point is that point on the optical axis from which the angular change in the line of sight caused by the movement of the pendulum is subtended on the leveling rod. This is explained in the book "Surveying for Civil Engineers," by Philip Kissam, published in 1956 by the McGraw-Hill Book Company on pages 196 through 198. One type of level of this type is described in U.S. Patent No. 2,779,231 which was issued on January 29, 1957, to Martin Drodofsky. When such levels utilize a conventional internal focusing telescope an error is introduced due to the movement to the anallatic point as the instrument is focused. Since the anallatic point moves, the projection of this point along the optical axis to the leveling rod will move vertically. This projection to the leveling rod is what the surveyor calls the "height of the instrument" and it is not strictly speaking a constant with the conventional type of internal focusing telescope. Errors caused in leveling because of the movement of the anallatic point in the conventional internal focusing telescope when applied to a pendulum operated level are usually not serious when the levels are focused at fairly long distances. The commerical form of the level disclosed in Patent No. 2,779,231 focuses only from 12 feet up to infinity. If such a telescope were designed to focus down to a few inches, the change in the height of instrument caused by the movement of the anallatic point would produce errors of serious magnitude. For this reason, the pendulum compensated telescopes have as yet not found application in optical tooling where it is essential to be able to focus down to very close distances.

The objects of the present invention are to provide a focusing telescope of constant magnification in which the anallatic point does not move when the telescope is focused and which will be suitable for stadia measurements of the highest accuracy down to very close distances and which will also be suitable for highly accurate leveling work down to very close distances from the instrument.

These objects of the invention and the means for their attainment will be more fully understood after reading the following description taken in conjunction with the drawings in which Fig. I is a view in sectional elevation of a conventional internal focusing surveying instrument telescope.

Fig. II is a view in sectional elevation of an internal focusing telescope constructed according to one embodiment of the invention.

Fig. III is a view in sectional elevation of an internal focusing telescope constructed according to another embodiment of the invention.

Figure IV is a sectional elevation of an internal focusing telescope constructed according to one embodiment of the invention in a self-leveling telescope structure.

In the conventional internal focusing telescope shown in Fig. I, the objective lens 2 is fixed in the telescope tube 4. The focusing lens 6, which is negative in this case, is carried in a draw tube 8 provided with adjusting means 10 for moving the focusing lens along the optical axis of the telescope in order to focus the telescope on various objects. In the embodiment shown, the adjusting means 10 takes the form of a pin which is threaded into the draw tube and which can be used for manually moving the draw tube within the telescope tube 4. It will be apparent to those skilled in the art that this construction for focusing is much simplified compared to that which is usually provided. Conventionally, the draw tube is provided with a rack which is preferably a spiral rack and which is driven by a spiral pinion mounted in the telescope tube 4. The reticle 12 provided in a suitable mount is adjustable by means of the four screws 14 to bring the cross wire markings or other pattern provided thereon in the center of the optical axis of the telescope. The pattern provided on the reticle will vary with the type of surveying instrument. It may include stadia lines if the instrument is intended to be used for stadia measurements or it may even consist simply of single horizontal line if the only function of the instrument is for leveling. The eye piece 16 is used for observing the image formed by the objective and focusing lens on the reticle markings. A four lens erecting eye piece is shown but it will be understood that other types of eye pieces may be used also. While the objective 2 is shown as a single lens it will be understood that this is usually a cemented doublet lens and even more complicated compound lenses are occasionally used for the objective. The focusing lens is also occasionally made in the form of a compound lens and may sometimes be a positive lens.

In the embodiment of Fig. II which illustrates one form of the present invention, fixed lens 20 is mounted in the telescope tube 24. Fixed lens 20 is located so that its focal plane will lie at the reticle 32 which may be provided with suitable markings as described in the previous paragraph. The reticle 32 is adjustable by means of the screws 34 to adjust the optical axis formed by the reticle and the fixed lens 20 and make it coaxial with the axis of the telescope tube 24. Focusing lens 26 which in this case is a negative focusing lens is mounted in front of the fixed lens 20 coaxial with it and the reticle 32. Focusing lens 26 is carried in a draw tube 28 which slides within the telescope tube 24 for focusing the telescope. Means 30 are provided for moving the focusing lens 26 axially in the telescope tube 24. As described in the previous paragraph the more conventional rack and pinion focusing means may also be used. The objective lens 22 is mounted in the telescope tube in front of the focusing lens 26 and is coaxial with the focusing lens 26, the fixed lens 20 and the reticle 32. The eye piece 36, which is again shown in the form of a four lens erecting eye piece, is provided for viewing the reticle 32 and is adjustable for focusing on the reticle 32 by sliding the eyepiece within the telescope tube 24.

It will be understood that other forms of eye pieces may be used. Lenses 22, 26 and 20 have been shown as simple single lenses but any one or all of these lenses may be more complicated in form. For example they may be cemented doublet lenses or separated doublet lenses or any of them may even contain more than 2 elements. The form which each of the lenses 22, 26 and 20 will take will, as is known in the art, depend upon the optical correction required to eliminate the lens aberrations to the necessary degree.

In the embodiment of Fig. III, the telescope tube 44, the draw tube 48, the focusing means 50, the fixed lens 40, the reticle 52, the adjusting screws 54 and the four lens erecting eye piece 56 are all the same as in the embodiment of Fig. II. However in this embodiment the objective lens 42 is a negative lens instead of the positive objective lens 22 shown in Fig. II. The focusing lens 46 shown in Fig. III is a positive focusing lens instead of the negative focusing lens 26 shown in Fig. II. As in the embodiment of Fig. II the lenses 42, 46 and 40 may take more complicated forms than the single element simple lenses shown in the drawing.

While in both embodiments shown in the drawing either the objective or the focusing lens is a negativ lens, it is also possible to use positive lenses for both of these lenses.

In both of the embodiments of Fig. II and Fig. III and any other embodiments of the invention the focal length of the objective will be considered to be $f_1$ hereinafter. However, in the case of Fig. II, $f_1$ will be a positive number since the objective lens 22 is positive and in the case of Fig. III the focal length $f_1$ of the objective lens 42 will be a negative number since the objective lens 42 is negative. Similarly the focal length of the focusing lens in each case will be represented by $f_2$. However, in the case of Fig. II, $f_2$ will be a negative number since a negative focusing lens is used and in the case of Fig. III, $f_2$ will be a positive number since a positive focusing lens is used. As already pointed out it is also possible for both $f_1$ and $f_2$ to be positive. The optical separation between the objective lens and the focusing lens for both Figs. II and III will be referred to hereinafter as S. It will be understood by those skilled in the art that the distance S should be measured from the second nodal point of the objective lens 22 or 42 to the first nodal point of the focusing lens 26 or 46. In accord with the present invention, the focal lengths and the separation of the objective lens and focusing lens when the telescope is focused at infinity must satisfy the following formula:

$$S = f_1 + f_2$$

Since the fixed lens 20 or 40 is mounted so that its principal focus coincides with the reticle 32 or 52 it is necessary that the rays entering the fixed lens 20 or 40 be parallel so that they will be focused on the reticle. When either of the telescopes shown in Figs. II and III is focused on an object along its optical axis which is closer than infinity diverging rays will enter the objective 22 or 42. In the embodiment of Fig. II these rays will be converged by the objective 22 and the position of the negative focusing lens 26 will be adjusted further from the objective so that the rays leaving it are parallel to the optical axis so that the fixed lens 20 will focus them on the reticle 32. In the case of the embodiment of Fig. III, the objective lens 42 will further diverge the rays entering it and the positive lens 46 will be adjusted further from the objective to make these rays parallel to the optical axis so that they will be focused by the fixed lens on to the reticle 52.

Substituting the nomenclature already used above in the Formula 15 on page 18 of the article in "Surveying and Mapping" referred to above becomes:

$$E = \frac{f_1(L - 2S_1 - d)}{f_1 + L - 2S_1 - d}$$

In this formula E is the position of the anallatic point measured from the objective. L is the distance from the objective to the reticle and d is the distance the focusing lens must be moved from its position when focused at infinity to focus the telescope for some near distance. If the telescope is constructed according to either of Figs. II or III the value of L in the above formula becomes infinity. L remains infinity at all object distances because the fixed lens 20 or 40 has been set to bring rays from infinity to focus on the reticle 32 or 52. When L in the above formula approaches infinity the ratio $$\frac{(L-2S-d)}{f_1+L-2S-d}$$

approaches unity. Therefore, when L is at infinity this ratio is unity and E equals $f_1$ regardless of the object distance or the position of the focusing lens 20 or 40. This means that the anallatic point is always in the first focal plane of the objective. In case $f_1$ is positive, E is positive and the anallatic point lies outside the system; i.e. in front of the objective. This is the case in the embodiment shown in Fig. II. In the embodiment shown in Fig. III, $f_1$ is negative and E becomes negative so that the anallatic point lies within the system; i.e. behind the objective.

This makes the embodiment of Fig. III more desirable than the embodiment of Fig. II for most applications of this type of telescope in surveying. For example if the telescope is to be used for stadia measurements it is desirable to have the anallatic point near the center of the instrument so that the measurements will be based from this point. The location of the anallatic point is also very important in automatic pendulum operated self leveling instruments. The proper relationship between the location of the anallatic point and the optical member which is pivoted is usually essential in order to obtain the utmost accuracy out of this type of level. If a telescope constructed according to Fig. III is used the location of the anallatic point can be controlled at will be merely choosing the proper focal length for the objective lens 42. The focal length of the focusing lens is then determined by the first formula given above.

The new type of telescope described above will make stadia measurements possible to a much greater degree of accuracy than has been theretofore attainable without the need for applying a stadia constant. It will also make it possible to construct self leveling pendulum operated instruments of the highest accuracy and to make these instruments useful at near distances as is required in optical tooling so that such levels will henceforth be useful for optical tooling as well as surveying. In Figure IV a fixed objective lens 122 is carried by the front end of telescope tube 124 in which a fixed lens 120 is also mounted spaced rearwardly from the objective lens 122. A focusing lens 126 which in this case is a negative lens is fixed in a draw tube 128 which is slidable within the telescope tube 124. This lens system corresponds to the lens system shown in Figure II. The self-leveling action is obtained by any suitable system such as that shown in Drodofski at al., Patent 2,779,231; to obtain the self-leveling a tilting body 130 and a pendulum body 131 are shown in the form of rollers, and are again interconnected by two pairs of crossing link ribbons 132. The reticle 133 is fixed relative to the telescope tube 128 and the titlting 130. The sighting line however, is deflected behind the telescope by the pendulum arrangement. To this end the tilting body 130 which is fixed in the telescope carries a reflecting prism 134 and the pendulum 131 carries a reflecting prism 135. Adjustment to compensate for inclination of the telescope is thereby provided within a certain range. In order to speed up setting the sighting line in a new position in the telescope the swinging motion of the pendulum is damped. For this purpose a cylinder 136 is provided within which moves a piston 137 connected with pendulum body 131. It will thereby be apparent that a self-leveling type of telescope is obtained with the focusing adjustment provided by the various modifications of the invention.

Having thus described the invention, what is claimed is:

1. A focusing telescope of constant magnification comprising a reticle, an eyepiece for observing said reticle and an image superimposed thereon, a fixed lens in front of said reticle located so that its principal focal plane will be at said reticle, an axially movable focusing lens coaxially mounted with said fixed lens and said reticle in front of said fixed lens and an objective lens coaxially mounted with said other elements in a fixed position in front of said focusing lens, whereby said telescope may be focused on objects coaxial therewith by moving said movable focusing lens, the image forming rays leaving said focusing lens and entering said fixed lens will be parallel irrespective of the distance of the object from the telescope and the position of the anallatic point of the telescope will be fixed in the first focal plane of the objective lens.

2. A focusing telescope of constant magnification comprising a reticle, an eyepiece for observing said reticle and an image superimposed thereon, a fixed lens in front of said reticle located so that its principal focal plane will lie at said reticle, an axially movable focusing lens coaxially mounted with said fixed lens and said reticle in front of said fixed lens and an objective lens coaxially mounted with said other elements in a fixed position in front of said focusing lens, one of said two lenses identified as said focusing lens and said objective lens being positive and the other being negative, whereby said telescope may be focused on objects coaxial therewith by moving said movable focusing lens, the image forming rays leaving said focusing lens and entering said fixed lens will be parallel irrespective of the distance of the object from the telescope and the position of the anallatic point of the telescope will be fixed in the first focal plane of the objective lens.

3. A focusing telescope of constant magnification comprising a rectile, an eyepiece for observing said reticle and an image superimposed thereon, a fixed lens in front of said reticle located so that its principal focal plane will lie at said reticle, an axially movable focusing lens of focal length $f_2$ coaxially mounted with said fixed lens and said reticle in front of said fixed lens and an objective lens of focal length $f_1$ coaxially mounted with said other elements in a fixed position in front of said focusing lens, one of said two lenses identified as said focusing lens and said objective lens being positive and the other being negative, the separation, S, of said objective lens and said focusing lens when said telescope is focused at infinity being given by $S=f_2+f_1$, whereby said telescope may be focused on objects coaxial therewith by moving said movable focusing lens, the image forming rays leaving said focusing lens and entering said fixed lens will be parallel irrespective of the distance of the object from the telescope and the position of the anallatic point of the telescope will be fixed in the first focal plane of the objective lens.

4. A focusing telescope of constant magnification comprising a reticle, an eyepiece for observing said reticle and an image superimposed thereon, a fixed positive lens in front of said reticle located so that its principal focal plane will lie at said reticle, an axially movable negative focusing lens of focal length $f_2$ coaxially mounted with said fixed lens and said reticle in front of said fixed lens and a positive objective lens of focal length $f_1$ coaxially mounted with said other elements in a fixed position in front of said focusing lens, the optical separation, S, of said objective lens and said focusing lens when said telescope is focused at infinity being given by $S=f_2+f_1$, whereby said telescope may be focused on objects coaxial therewith by moving said movable focusing lens, the image forming rays leaving said focusing lens and entering said fixed lens will be parallel irrespective of the distance of the object from the telescope and the position of the anallatic point of the telescope will be fixed in the first focal plane of the objective lens.

5. A focusing telescope of constant magnification comprising a reticle, an eyepiece for observing said reticle and an image superimposed thereon, a fixed positive lens in front of said reticle located so that its principal focal plane will lie at said reticle, an axially movable positive focusing lens of focal length $f_2$ coaxially mounted with said fixed lens and said reticle in front of said fixed lens and a negative objective lens of focal length $f_1$ coaxially mounted with said other elements in a fixed position in front of said focusing lens, the optical separation, S, of said objective lens and said focusing lens when said telescope is focused at infinity being given by $S=f_2+f_1$, whereby said telescope may be focused on objects coaxial therewith by moving said movable focusing lens, the image forming rays leaving said focusing lens and entering said fixed lens will be parallel irrespective of the distance of the object from the telescope and the position of the anallatic point of the telescope will be fixed in the first focal plane of the objective lens.

6. A focusing telescope of constant magnification for making stadia measurements comprising a reticle provided with stadia markings, an eyepiece for observing said reticle and an image superimposed thereon, a fixed lens in front of said reticle located so that its principal focal plane will be at said reticle, an axially movable focusing lens coaxially mounted with said fixed lens and said reticle in front of said fixed lens and an objective lens coaxially mounted with said other elements in a fixed position in front of said focusing lens, whereby said telescope may be focused on objects coaxial therewith and having stadia markings by moving said movable focusing lens, the image forming rays leaving said focusing lens and entering said fixed lens will be parallel irrespective of the distance of the object from the telescope and the position of the anallatic point of the telescope will be fixed in the first focal plane of the objective lens so that the stadia interval on said object subtended by the stadia interval on said reticle multiplied by a stadia constant will give a precise measurement of the distance of said object from a fixed point at said telescope.

7. A focusing telescope of constant magnification for making stadia measurements carried on a surveying instrument, said telescope comprising a reticle provided with stadia markings, an eyepiece for observing said reticle and an image superimposed thereon, a fixed positive lens in front of said reticle located so that its principal focal plane will lie at said reticle, an axially movable positive focusing lens of focal length $f_2$ coaxially mounted with said fixed lens and said reticle in front of said fixed lens and a negative objective lens of focal length $f_1$ coaxially mounted with said other elements in a fixed position in front of said focusing lens, the optical separation, S, when said telescope is focused at infinity being given by $S=f_2+f_1$ and said negative objective lens being located a distance $f_1$ from the vertical axis of the surveying instrument, whereby said telescope may be focused on objects coaxial therewith and having stadia markings by moving said movable focusing lens, the image forming rays leaving said focusing lens and entering said fixed lens will be parallel irrespective of the distance of the object from the telescope and the position of the anallatic point of the telescope will be fixed in the first focal plane of the objective lens so that the stadia interval on said object subtended by the stadia interval on said reticle multiplied by a stadia constant will give a precise measurement of the distance of said object from the vertical axis of said surveying instrument.

8. In a surveyor's level, a focusing telescope of constant magnification comprising a reticle provided with a horizontal line, an eyepiece for observing said reticle and an image superimposed thereon, a fixed lens in front of said reticle located so that its principal focal plane will be at said reticle, an axially movable focusing lens coaxially mounted with said fixed lens and said reticle in front of said fixed lens, an objective lens coaxially mounted with said other elements in a fixed position in front of said focusing lens and pendulum controlled optical means in the optical path of said telescope constructed, whereby said telescope may be focused on objects coaxial therewith by moving said movable focusing lens, the image forming rays leaving said focusing lens and entering said fixed lens will be parallel irrespective of the distance of the object from the telescope and the position of the anallatic point of the telescope will be fixed in the first focal plane of the objective lens so that when said pendulum is operating said telescope will image points of said objects into coincidence with the horizontal line of said reticle which lie precisely in the same horizontal plane as the horizontal line of said reticle, irrespective of the distance of said objects from said telescope.

References Cited in the file of this patent

UNITED STATES PATENTS

| 924,488 | Mustin | June 8, 1909 |
| 1,016,311 | Wild | Feb. 6, 1912 |
| 2,779,231 | Drodofsky | Jan. 29, 1957 |

FOREIGN PATENTS

| 310,553 | Switzerland | Dec. 16, 1955 |

UNITED STATES PATENT OFFICE
CERTIFICATE OF CORRECTION

Patent No. 2,937,570                            May 24, 1960

Conway D. Hillman

It is hereby certified that error appears in the printed specification of the above numbered patent requiring correction and that the said Letters Patent should read as corrected below.

Column 1, line 17, for "an" read -- and --; column 4, line 16, for "negativ" read -- negative --; column 5, line 32, for "be", second occurrence, read -- by --; line 38, for "theretofore" read -- heretofore --; line 52, for "at al" read -- et al --; line 57, for "titlting 130" read -- tilting body 130 --; line 61, after "pendulum" insert -- body --; column 6, line 34, for "rectile" read -- reticle --.

Signed and sealed this 11th day of April 1961.

(SEAL)
Attest:

ERNEST W. SWIDER                            ARTHUR W. CROCKER
Attesting Officer                                Acting Commissioner of Patents